United States Patent [19]

Guenther et al.

[11] Patent Number: 4,702,440
[45] Date of Patent: Oct. 27, 1987

[54] SATELLITE STATION

[75] Inventors: Hans-Juergen Guenther, Bremen; Ortwin Golbeck, Hude; Joachim Nauck, Bremen, all of Fed. Rep. of Germany

[73] Assignee: Erno Raumfahrttechnik GmbH, Bremen, Fed. Rep. of Germany

[21] Appl. No.: 917,851

[22] Filed: Oct. 14, 1986

[30] Foreign Application Priority Data

Oct. 14, 1985 [DE] Fed. Rep. of Germany ....... 3536577

[51] Int. Cl.⁴ .............................................. B64G 1/22
[52] U.S. Cl. .................................. 244/158 R; 244/165
[58] Field of Search ................... 244/158 R, 159, 161, 244/165, 3.15, 3.22, 3.23; 102/378, 377, 393; 343/766; 192/70.22; 89/1.808; 74/5.1, 5.12, 5.7, 814

[56] References Cited

U.S. PATENT DOCUMENTS 3,174,706  3/1965  Wagner ............................. 102/377
3,420,470  1/1969  Meyer ............................... 102/378
3,526,143  9/1970  Henley ................................. 74/5.1
3,981,467  9/1976  Ludlow ........................... 244/158 R
3,992,955  11/1976  Evans et al. ...................... 74/5.12
4,415,130  11/1983  Staehlin ............................ 244/3.15

FOREIGN PATENT DOCUMENTS 1435514  3/1966  France ............................ 244/158 R Primary Examiner—Galen Barefoot
Attorney, Agent, or Firm—Ralf H. Siegemund

[57] ABSTRACT

In a satellite or space station having at least one stabilized service module and a payload module connected thereto in different orientations, an interconnecting and coupling structure includes latchable lift-and-turn mechanisms having some components in the service module and remaining components in the payload module; relative lift is provided such that the components are interconnected to obtain the interconnection of the modules; the modules are independently and releasably interconnected for latching and locking them together while the lift-and-turn mechanism is disconnected.

4 Claims, 3 Drawing Figures

SATELLITE STATION

BACKGROUND OF THE INVENTION

The present invention relates to a satellite or satellite station for missions in outer space and including a stabilized space capsule, such as a service module, as well as a platform as a payload module coupled to the service module and being rotatable in relation thereto, so as to be capable of being oriented in a manner differently from the orientation of the, say, orbiting space capsule or just the service module.

Satellite stations when placed in orbit are oriented so as to have a particular orientation generally, relative to the sun or to the earth. The orientation is determined and maintained under utilization of a spin or gyro effect. Aside from orienting the space station or a part thereof to the sun or towards the earth, it is also possible, to use other reference points and reference elements for purposes of obtaining a particular orientation.

Space stations and satellites are often, possibly even normally, composed basically of two modules, a service module and a payload platform type module. On account of their differences in function, they usually have to be oriented differently and oriented in relation to different reference points or directions. For example, a service module holds solar generators such as deployable solar panels or the like, and it is, therefore, necessary to orient the service module in relation to the sun. On the other hand, the respective associated payload may perform some functions in relation to the earth and, therefore, should be oriented in relation to the earth underneath. Alternatively, it may be the function of the station to make certain observations in a particular direction in outer space, then, of course, the orientation must be such as to accommodate the task to be performed.

Upon constructing the satellites and satellite type space stations in the past, it was customary to interconnect the various modules through rigid but rotatable connections. These interconnections, including particularly rotatable connections, experienced a high acceleration on lauching, in that the full acceleration force was transmitted through the connection as a load acting on the connection. Basically this is an unsatisfactory condidition, because it requires a construction which is to be dimensioned primarily just for this particular short instance of launching during which the high acceleration occurs. As far as the subsequent flight and orbiting is concerned, these connections are considerably overdimensioned.

DESCRIPTION OF THE INVENTION

It is an object of the present invention to provide a new and improved construction for satellite stations wherein the individual modules are interconnected through light weight, but sufficiently rigid, rotatable coupling elements.

It is a particular object of the present invention to provide a new and improved satellite station for mission in outer space including a stabilized service module and a payload platform, rotatably coupled thereto, so as to be subject to orientation different from the orientation of the service module, the improvement relating to the coupling structure between the modules.

In accordance with the preferred embodiment of the present invention, it is suggested to interconnect the modules through a latchable lift-and-turn mechanism, having a first state of operation, wherein the rotating mechanism is decoupled and service module as well as payload platform are separately latched and locked to each other, while in a second, or alternative state of operation and following release of the latter latching, the lift mechanism provides for coupling of the turn mechanism to be now effective in that fashion as permanent coupling between service module and payload, which no longer has to take up significant (launch type) forces.

The inventive dual/alternate connection of the modules in a satellite station offers the advantage that during launching high acceleration forces will not be reacted through the rotating mechanism on account of its being decoupled. The various modules do not transmit any acceleration forces through the rotating mechanism, but owing to their being locked to each other separately, they bear against each other directly. This means that the rotating mechanism can be designed independently from the accelerating forces as far as transmission of forces is concerned.

In an advantageous configuration and embodiment of the invention, the rotating mechanism is comprised of a drive motor coupled to the payload platform, and the drive shaft of the motor is coupled to a sleeve mounted concentric to the motor; a flange of the sleeves carries certain coupling elements which are spring-biased in that compression spring means bear against the service module while complementary coupling elements sit on a partition being connected to the service module and circumscribing annularly the aforementioned sleeve. In this regard, it is of particular advantage to provide the partition on a tubular casing type jacket of the service module which can be latched and locked by means of a releasable lock or latch element with a tubular housing pertaining to the payload platform. This way then, the modules are interconnectable without involving the turning and rotating mechanism, while following the release of the latch and lock structure, the lift mechanism separates the service module from the payload platform whereby immediately above mentioned coupling elements of the rotating and turning mechanism are interconnected such as to interconnect the service module and the payload platform. The compression springs bearing against a flange of the sleeve constitute in effect the lifting mechanism and become effective following release of the connection between service module casing and payload casing. For purposes of latching and locking the service module to the payload platform, flange may be provided on each of the opposing ends of the tubular casing, which are interconnected rigidly through a releasable tension strip, having U-shaped cross-sections.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

Proceeding now to the detailed description of the drawings. FIGS. 1, 2, and 3 illustrate two modules pertaining to a satellite and space station. They are, for example, a service module 10 and a payload module or platform or module platform 11. Each of these modules is comprised of a body from which extends a tubular casing or jacket, 12 and 13, respectively. These jackets or casing 12 and 13 are of equal diameter and are provided with axial end flanges 14 and 15, and these flanges of the two casings face each other in the operating state depicted in FIG. 1.

Figure 1:
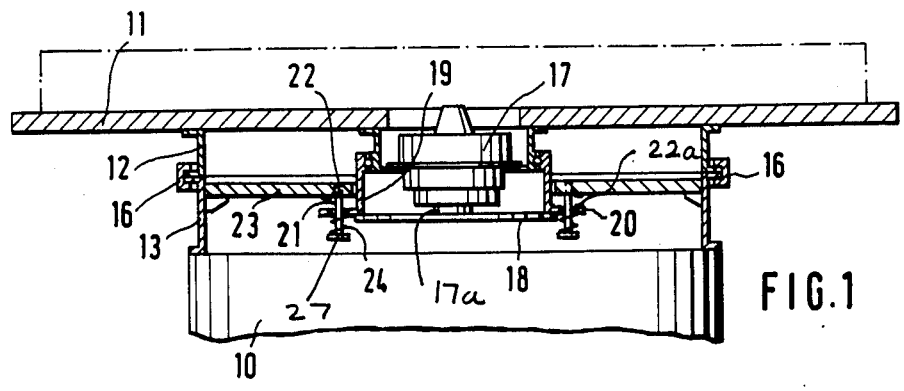
FIG. 1 illustrates a portion of a service module, a portion of a payload platform, and a latched interconnect structure in-between in accordance with the preferred embodiment of the present invention for practicing the best mode thereof.

A tension strip or ribbon 16 of U-shaped cross-section is placed around the two flanges 14 and 15, also as shown specifically in FIG. 1. The legs of the U, in fact, grip around the respective flanges on sides facing away from the respective other flange and this way then, the two modules 10 and 11 are locked and latched to each other. When in this latching and locking operating condition being, so to speak, the first operating state of the overall module interconnect mechanism, a lift-and-turn mechanism is decoupled.

This condition is particularly maintained during launching. The lift-and-turn mechanism is basically arranged within the casings or jackets 12 and 13. That is to say, different portions or components of the lift-and-turn mechanisms are contained in these two different jackets and casings, and these portions are, in fact, disconnected from each other, but the lift mechanism is tensioned or biased in a manner that will permit coupling of these mechanism components, after the strip 16 has been removed, as will be described next.

The turn mechanism is comprised of a drive motor 17, mounted in the payload module 11. The motor 17 has a drive shaft 17a, being connected to a disk 18 having a flange 20 to thereby connect the drive motor with its shaft to a sleeve 19. This sleeve 19 extends around and includes, as far as spatial enclosure is concerned, the motor 17. Compression springs 24 bear against the flange 20, on one hand, and the head of guide pins 27, on the other hand. Coupling elements 22a are provided on the payload module 11 generally, and on flange 20 in particular. Counter coupling pieces elements 22 are provided on a partitioning 23 for facing the coupling elements 22a. The partition 23, in turn, circumscribes the sleeve 19 in an annular fashion and is fastened to the tubular jacket 13 for the service module 10. The springs 11 constitute the lift mechanism.

As can be seen from FIG. 1, the turn mechanism, i.e. the components of the turn mechanism in different modules are decoupled, so that as far as that mechanism is concerned, modules 10 and 11 are disconnected from each other. On the other hand, as was mentioned, the two modules 10 and 11 are interconnected through their respective flanges 14 and 15, and the tension strip 16. In this operating state then, it is possible to launch the entire structure without having the load of the acceleration transmitted through the turning mechanism.

Figure 2:
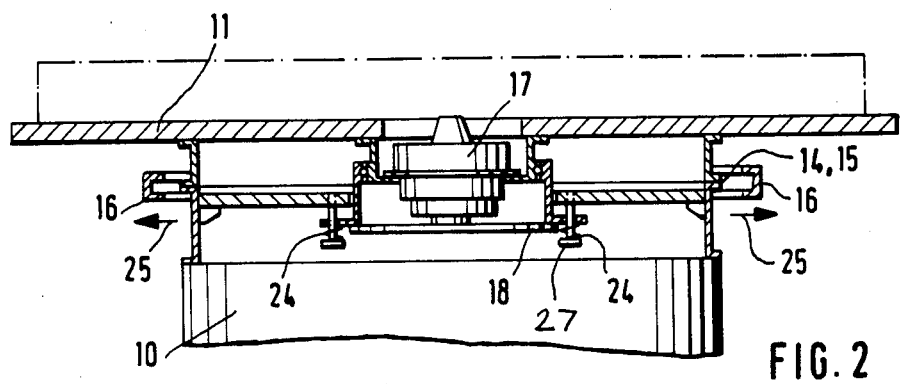
FIG. 2 illustrates these modules of FIG. 1, but following release of the latch and lock mechanism.
Figure 3:
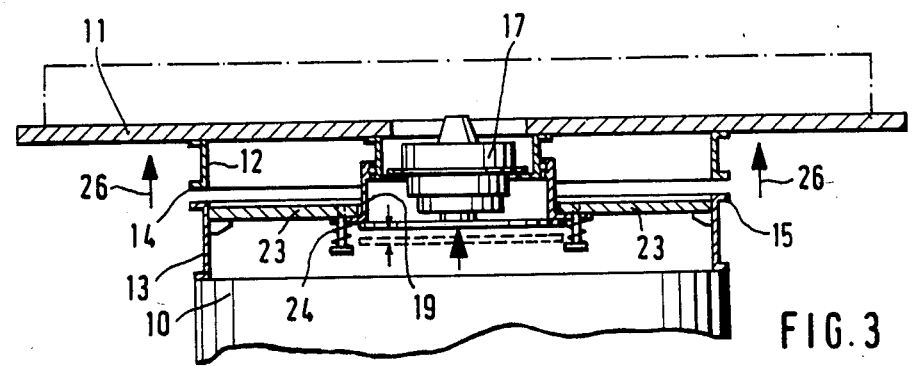
FIG. 3 illustrates the same modules when rotatably interconnected.

FIG. 2 illustrates now the instant following a suitable release of the tension ribbon 16. This release is symbolically indicated by the arrows 25. At the instant of release, nothing further happens but soon thereafter, the situation entails shown in FIG. 3. Here then, it appears that the two modules 10 and 11 have separated from each other a little, but now the turn mechanism is coupled. The springs 24 have acted as a lift mechanism and provided for the separation of the modules 10 and 11 to the extent needed. The arrows 26 indicate the separation, namely, until flange 20 is juxtaposed to partition 23, and the coupling elements 22a, 22 engage. The modules can now be rotated in relation to each other while being physically interconnect through this turning mechanism.

The invention is not limited to the embodiments described above, but all changes and modifications thereof, not constituting departures from the spirit and scope of the invention are intended to be included.

We claim:

1. In a satellite or space station, which is comprised of at least one stabilized service module, and a payload module, to be connected to the service module so as to permit the two modules to be oriented differently in relation to each other, an interconnecting and coupling structure comprising:

latchable lift-and-turn mechanisms having some components in the service module and remaining components in the payload module, and constructed for rotatably interconnecting the two modules but being prior and during launching disconnected from each other, there being means for providing a lift such that the said components are interconnected to obtain the interconnection of the service module and of the payload module; and a means for independently and releasably interconnecting latching and locking the two modules together while said lift-and-turn mechanism is disconnected.

2. The connect structure as in claim 1 wherein the lift and turn mechanism includes a drive motor in the payload module, having a drive shaft connected to a concentrically arranged sleeve having a flange, there being a spring bearing against said flange, as well as against the service module, tending to axially move the payload module, away from the service module, there being first coupling elements on the flange, there being in addition a partition connected to the service module, circumscribing the sleeve and carrying additional coupling elements for engagement with the first mentioned coupling elements when said axially displacement occurs on account of the compression spring following a release of the clamping means.

3. A construction as in claim 2, said service module having a tubular casing, said partition extending radially, inwardly from said tubular casing, said payload platform likewise including a tubular casing, said casings provided with flanges, said means for latching and locking connecting the two flanges together.

4. The connect structure as in claim 3, wherein said means includes a tension strip of U-shaped cross-section, the legs of the U gripping around the flanges.

* * * * *